United States Patent
Himmelmann

(10) Patent No.: US 10,167,732 B2
(45) Date of Patent: Jan. 1, 2019

(54) PASSIVE OVERSPEED CONTROLLED TURBO PUMP ASSEMBLY

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 640 days.

(21) Appl. No.: 14/695,079

(22) Filed: Apr. 24, 2015

(65) Prior Publication Data

US 2016/0312652 A1 Oct. 27, 2016

(51) Int. Cl.

| | |
|---|---|
| *F02K 9/00* | (2006.01) |
| *F01D 21/02* | (2006.01) |
| *F01D 17/20* | (2006.01) |
| *F02K 9/48* | (2006.01) |
| *F02K 9/56* | (2006.01) |
| *F02K 9/80* | (2006.01) |
| *F02K 9/84* | (2006.01) |
| *F01D 5/02* | (2006.01) |

(Continued)

(52) U.S. Cl.
CPC .............. *F01D 21/02* (2013.01); *F01D 5/02* (2013.01); *F01D 9/02* (2013.01); *F01D 15/08* (2013.01); *F01D 15/10* (2013.01); *F01D 17/20* (2013.01); *F01D 17/205* (2013.01); *F02K 9/48* (2013.01); *F02K 9/563* (2013.01); *F02K 9/805* (2013.01); *F02K 9/84* (2013.01); *F04D 17/08* (2013.01); *F04D 27/0261* (2013.01); *F05D 2210/12* (2013.01); *F05D 2220/30* (2013.01); *F05D 2220/768* (2013.01); *F05D 2240/128* (2013.01); *F05D 2240/24* (2013.01); *F05D 2260/406* (2013.01); *F05D 2270/021* (2013.01); *F05D 2270/42* (2013.01); *F05D 2270/64* (2013.01)

(58) Field of Classification Search
CPC .. F04D 15/0066; F04D 27/0261; F04D 13/04; F02K 9/84; F02K 9/563; F02K 9/805
See application file for complete search history.

(56) References Cited

U.S. PATENT DOCUMENTS

| | | | |
|---|---|---|---|
| 2,707,866 A | 5/1955 | Noon et al. | |
| 3,052,252 A | 9/1962 | Laucks et al. | |

(Continued)

FOREIGN PATENT DOCUMENTS

| | | |
|---|---|---|
| EP | 2682590 A2 | 1/2014 |
| GB | 191105990 A | 8/1911 |
| WO | 20140174285 A2 | 10/2014 |

OTHER PUBLICATIONS

Hans Martensson, Sonny Andersson, Stefan Trollheden, Staffan Brodin; Rocket Engines Turbomachinery, 2008.*

(Continued)

*Primary Examiner* — Gerald L Sung
(74) *Attorney, Agent, or Firm* — Carlson, Gaskey & Olds, P.C.

(57) ABSTRACT

A turbine pump assembly has a turbine, a centrifugal pump, and a passive electrical speed control system. The turbine has a peak efficiency at a first speed that is lower than a second speed at which the centrifugal pump is operating at a peak power requirement. A rocket thrust vector control system is also disclosed.

20 Claims, 5 Drawing Sheets

(51) Int. Cl.
  *F01D 9/02*   (2006.01)
  *F01D 15/08*  (2006.01)
  *F01D 15/10*  (2006.01)
  *F04D 17/08*  (2006.01)
  *F04D 27/02*  (2006.01)

(56) References Cited

U.S. PATENT DOCUMENTS

| | | | |
|---|---|---|---|
| 3,078,739 A | | 2/1963 | Weinrich |
| 4,073,138 A | * | 2/1978 | Beichel ............... F02K 9/48 60/245 |
| 4,165,795 A | | 8/1979 | Lynch et al. |
| 4,309,871 A | * | 1/1982 | Venema ............... F02C 9/28 417/43 |
| 4,334,823 A | * | 6/1982 | Sharp ............... F03D 3/067 416/117 |
| 4,599,044 A | * | 7/1986 | Jacobson ............ F02K 9/805 417/22 |
| 4,761,187 A | * | 8/1988 | Paton ............... C22C 38/22 148/542 |
| 5,003,772 A | | 4/1991 | Huber |
| 8,418,967 B2 | | 4/2013 | Hemmelgarn et al. |
| 8,718,831 B2 | | 5/2014 | Wang et al. |
| 2005/0201862 A1 | * | 9/2005 | Wastling ............ F03D 7/0224 416/98 |
| 2006/0222523 A1 | * | 10/2006 | Valentian ............ F17C 7/04 417/313 |
| 2008/0075595 A1 | | 3/2008 | Proven |
| 2011/0038727 A1 | * | 2/2011 | Vos ............... B64C 3/46 416/1 |
| 2013/0216378 A1 | | 8/2013 | Himmelmann |
| 2014/0174076 A1 | | 6/2014 | VanDyne et al. |

OTHER PUBLICATIONS

USH2057, published Jan. 7, 2003—Veers, et al.
European Search Report for European Application No. 16165713.5 dated Sep. 2, 2016.

\* cited by examiner

PASSIVE OVERSPEED CONTROLLED TURBO PUMP ASSEMBLY

BACKGROUND

This application relates to a turbine pump assembly, and more particularly to a passive overspeed controlled turbine pump assembly.

Rockets are maneuvered by vectoring the rocket engine thrust direction. A thrust vector control system often relies on hydraulic rams to displace the engine nozzle angle. Such hydraulic rams require high pressure hydraulic fluid pumping systems, capable of providing very high flow rates. This hydraulic flow is typically generated by a Turbine Pump Assembly (TPA), which may be powered by a fluid propellant provided by the main engine turbo-pump assembly.

A traditional TPA comprises a turbine and a hydraulic pump. Typically, the turbine operates at very high rotational speeds, such as 115,000 rpm, while the hydraulic pump operates at lower speeds, such as 6100 rpm. A gear reduction system is incorporated between the hydraulic pump and the turbine to accommodate the different operating speeds.

A traditional TPA further includes a Turbine Speed Control Valve Assembly to control the fluid flowing to the turbine, and thus the turbine rotational speed. The output power of the turbine is proportional to the mass flow rate of the propellant through the valve. In traditional systems, this valve assembly comprises a spring and a fly weight governor assembly. As the turbine spins, the fly weight governor assembly also rotates. As the fly weight governor rotates, a centripetal force is applied to arms of the fly weight governor, proportional to the rotational speed of the turbine. When the turbine and fly weight governor reach a particular speed, the fly weight governor arms push against the spring, causing the valve to partially close. As the turbine spins faster, the valve is pushed further closed. When the turbine reaches a desired speed, the fly weight governor forces are balanced against the spring force, with the valve open just far enough to maintain the turbine speed.

If additional load is applied to the TPA by the hydraulic system, the turbine will decelerate. When the turbine slows down, the centripetal force acting on the fly weight governor arms is reduced, allowing the spring to push the valve further open, allowing more propellant to flow into the turbine, causing the turbine to speed back up to the desired speed. This system is well developed, but also complex and expensive.

SUMMARY

A turbine pump assembly has a turbine, a centrifugal pump, and a passive electrical speed control system. The turbine has a peak efficiency at a first speed that is lower than a second speed at which the centrifugal pump is operating at a peak power requirement. A rocket thrust vector control system is also disclosed.

The various features and advantages of this invention will become apparent to those skilled in the art from the following detailed description of an embodiment. The drawings that accompany the detailed description can be briefly described as follows.

DETAILED DESCRIPTION

Figure 1:
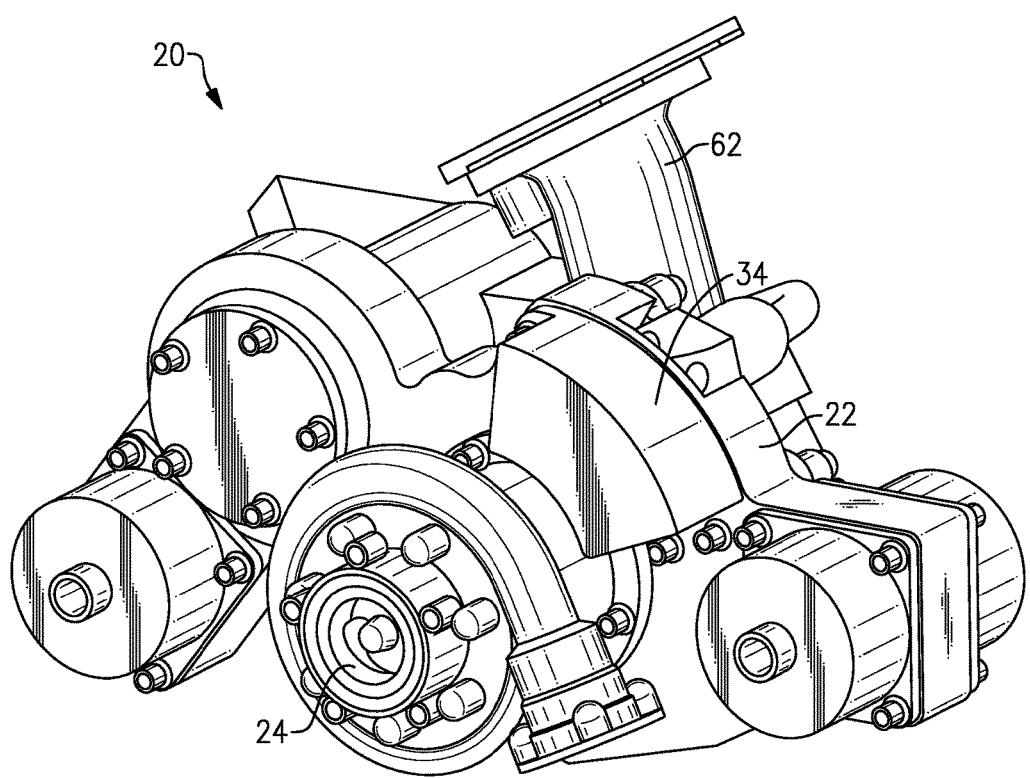
FIG. 1 shows a perspective view of a turbine pump assembly.

Referring to FIG. 1, a turbine pump assembly (TPA) system 20 includes a turbine 22 and a centrifugal pump 24. The TPA 20 may be powered by a propellant, such as hydrogen gas, provided by the main engine turbo-pump assembly 29 (shown in FIG. 2). Other propellants are contemplated, such as oxygen, methane, helium, or nitrogen, for example. The centrifugal pump 24 allows the TPA 20 to be much smaller than the traditional system that utilizes a hydraulic pump.

Figure 2:
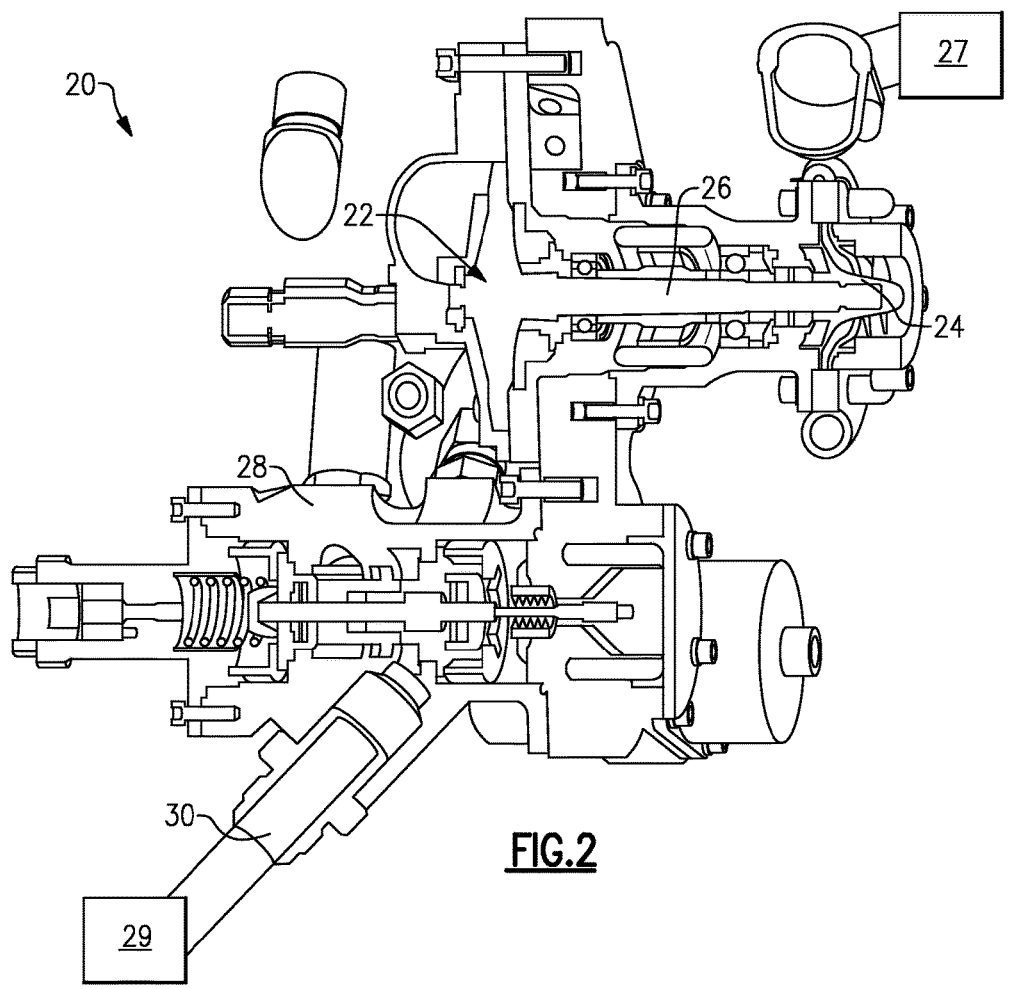
FIG. 2 shows a cross section of the turbine pump assembly of FIG. 1.

Both the turbine 22 and centrifugal pump 24 are capable of operating at very high speeds, and thus are configured to rotate on a single shaft 26, as shown in FIG. 2. In one example, the operating speed of the turbine 22 and centrifugal pump 24 is between 90,000 rpm and 140,000 rpm. The turbine 22 drives the centrifugal pump 24 through the shaft 26. Hydraulic fluid from the centrifugal pump 24 is communicated to an engine nozzle 27 (shown schematically) to displace a rocket engine nozzle angle relative to a rocket core axis. The operation of the engine nozzle 27 and how the angle is adjusted are known.

Although disclosed as part of a rocket engine nozzle control, this disclosure may have application in other systems.

Since the turbine 22 and centrifugal pump 24 both operate at high speeds, and thus can operate on the same shaft 26, a gear reduction between the turbine 22 and the centrifugal pump 24 is not required. This configuration results in fewer moving parts in the overall system than a traditional TPA. The higher speeds of the single shaft 26 also prohibit the use of the fly weight governor used in traditional systems.

A speed control valve 28 controls the amount of propellant that goes to the turbine 22 from a main engine turbo-pump assembly 29 (shown schematically) through a turbine gas inlet port 30. When propellant is supplied to the turbine gas inlet port 30, propellant flows through the speed control valve 28 and to the turbine 22, causing the turbine 22 to rotate. As the mass flow rate of the propellant increases, the speed of the turbine 22 will increase. The speed control valve 28 controls the speed of the turbine 22 by varying the mass flow rate of the propellant.

Figure 3:
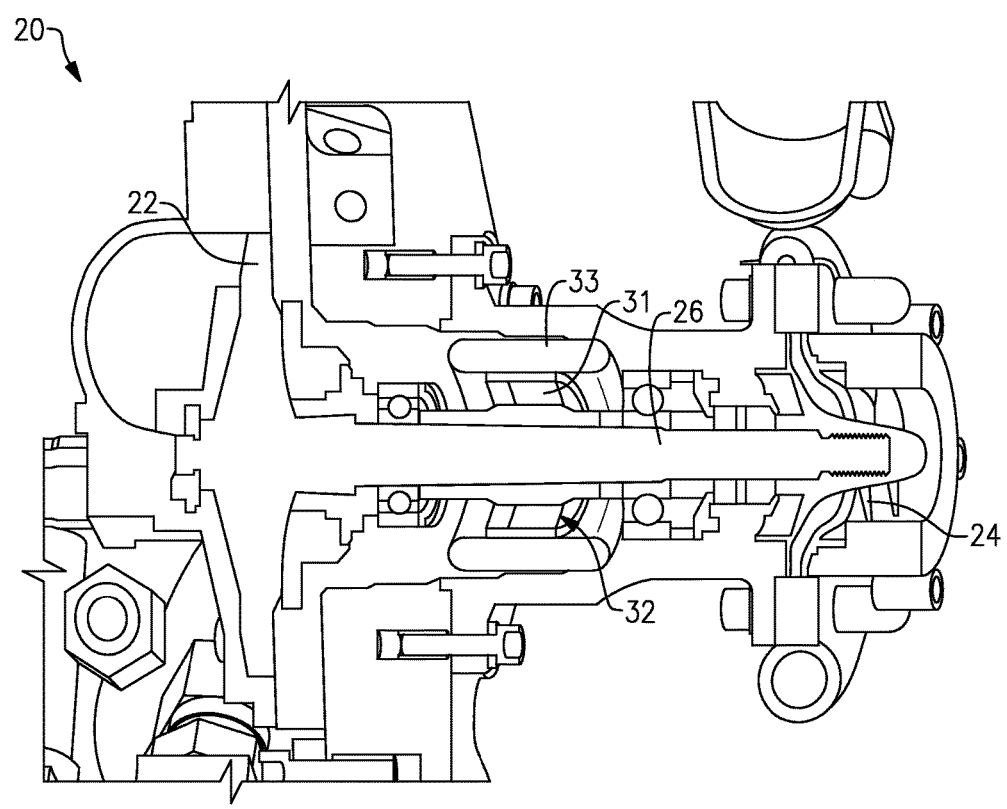
FIG. 3 shows a partial view of a portion of the turbine pump assembly of FIG. 1.

FIG. 3 shows the rotating components of the TPA 20. A generator 32 is arranged along the shaft 26 between the turbine 22 and the centrifugal pump 24. In one embodiment, the generator 32 is a high speed permanent magnet generator. In the illustrated embodiment, the generator 32 comprises permanent magnets 31 that rotate with the shaft 26, and generate a current in a stationary coil 33. The permanent magnet generator 32 generates alternating current power proportional to the rotational speed of the turbine 22. This alternating current power is passively rectified by a passive rectifier 34 (shown in FIG. 1) into direct current power proportional to the rotational speed of the turbine 22, which is then used to control the speed of the turbine 22.

Figure 4:
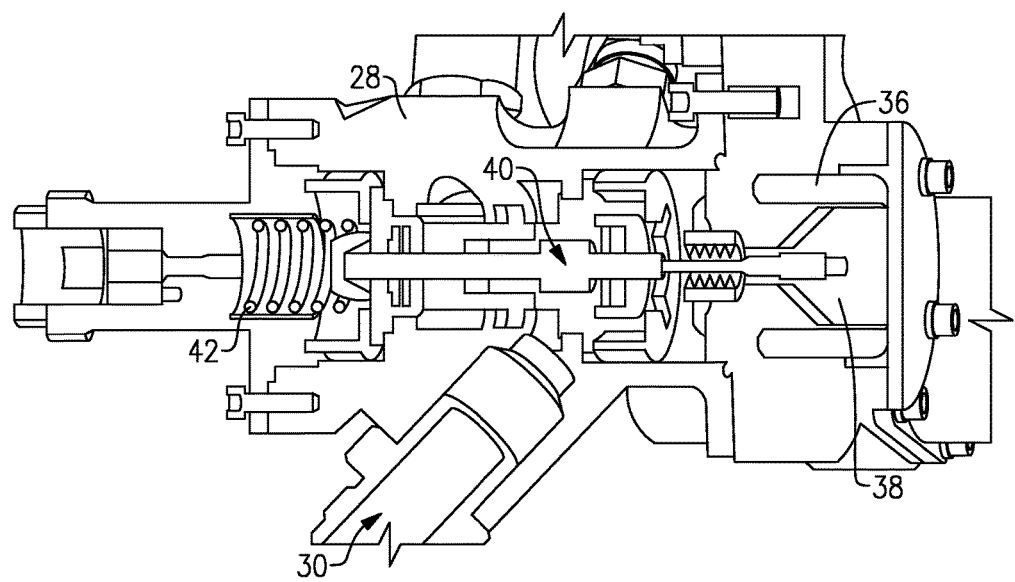
FIG. 4 shows a partial view of a portion of the turbine pump assembly of FIG. 1.

FIG. 4 shows the turbine speed control valve assembly 28, which provides passive electrical proportional turbine speed control. In the illustrated embodiment, the direct current power from the passive rectifier 34 is sent to a valve control solenoid 36. The solenoid 36 produces an electromagnetic force applied to a valve control solenoid plunger 38, which exerts an axial force that is proportional to the direct current power that is flowing in the windings of solenoid 36. Because the direct current power is proportional to the speed of the turbine 22, the axial force produced by solenoid 36 is also proportional to the speed of the turbine 22. This axial force exerted by the plunger 38 pushes against a valve spool 40, which pushes against a valve opening spring 42. In another embodiment, a linear motor or electromechanical actuator may be used to displace the valve spool 40. In the shown example, the axial force exerted by plunger 38 causes the valve spool 40 to shift to the left, compressing the valve opening spring 42 and decreasing the mass flow rate of the propellant entering the turbine 22 through the turbine inlet port 30.

As the turbine 22 spins faster, more alternating current power is generated at the permanent magnet generator 32, creating more direct current power rectified by the passive rectifier 34. As direct current power in the valve control solenoid 36 increases, the electromagnetic force applied to the valve control solenoid plunger 38 increases. The increased electromagnetic force results in an increased axial force exerted by the plunger 38. The increased axial force exerted by the plunger 38 pushes the valve spool 40, which pushes the spring 42 to push the valve 28 further closed, which decreases the mass flow rate of propellant entering the turbine 22, thus decreasing the speed of the turbine 22. When the turbine 22 reaches a desired speed, the axial force generated by the valve control solenoid 36 is balanced with the spring force of spring 42, such that the valve 28 is open just far enough to maintain a desired speed of the turbine 22.

As the speed of the turbine 22 decreases, the electromagnetic force applied to the valve control solenoid plunger 38 decreases, causing the valve spool 40 to shift in the opposite direction, decompressing the valve opening spring 42. When the valve opening spring 42 is decompressed, the mass flow rate of propellant entering the turbine 22 through turbine gas inlet port 30 increases. The desired mass flow rate and turbine speed depend on the requirements of a particular system. Details of the passive electrical speed control system are found in co-pending U.S. patent application Ser. No. 14/695,073, entitled "Passive Electrical Proportional Turbine Speed Control System" filed on even date herewith. Details of a circuit breaker control valve are found in co-pending U.S. patent application Ser. No. 14/695,082, entitled "Pneumatic Circuit Breaker Based Self Resetting Passive Overspeed Control Valve for Turbine Pump Assembly" filed on even date herewith.

If the passive electrical proportional turbine speed control system becomes damaged, the solenoid 36 may stop providing an axial force to the valve spool 40. When no axial force is applied to the valve spool 40, the spring 42 will decompress, causing the valve 28 to fully open, which allows the turbine 22 to accelerate to undesirable speeds.

Figure 5:
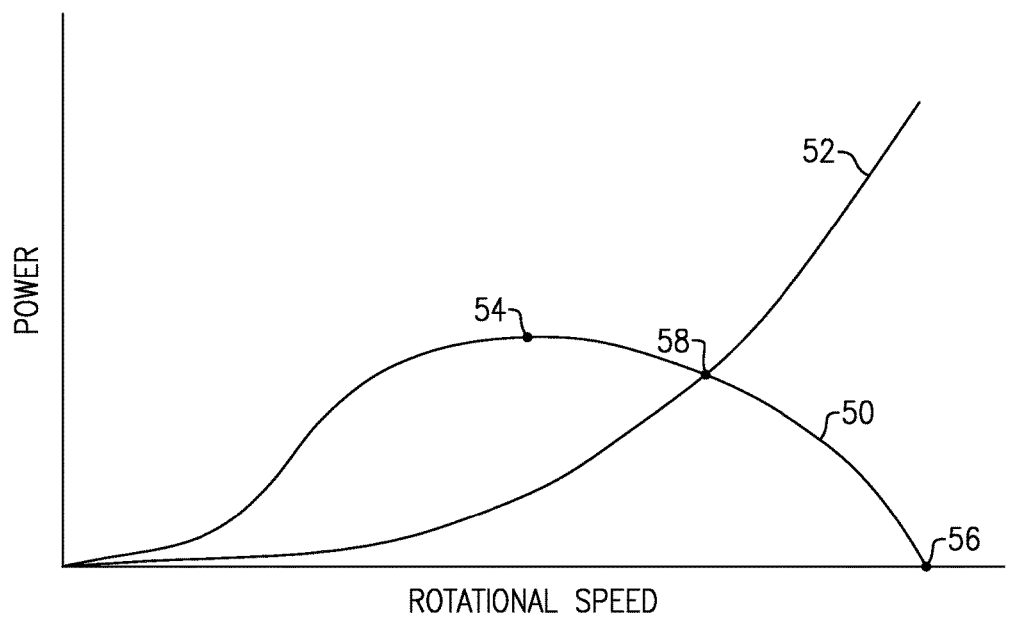
FIG. 5 shows a graph of speed and power of the turbine pump assembly of FIG. 1.

Passive overspeed protection can be accomplished by designing the turbine 22 such that the peak efficiency of the turbine 22 occurs at a rotational speed that is below the peak power requirement of the centrifugal pump 24, as shown in FIG. 5. Curve 50 shows the power capability of turbine 22. Curve 52 shows the required power of the centrifugal pump 24. The peak efficiency point 54 of turbine power curve 50 shows the rotational speed at which the turbine 22 will produce the most power. As the rotational speed of turbine 22 increases beyond the peak efficiency 54, efficiency of the turbine 22 is reduced due to incidence losses, blockage, and leakage. Incidence losses occur because the fluid incidence angle at an inlet of the turbine 22 causes an aerodynamic blockage in turbine blade passages, decreasing the efficiency of the turbine 22, and thus the output power of the turbine 22. At point 56, where the turbine efficiency drops to zero, the blades of the turbine 22 are completely stalled.

As the speed of the centrifugal pump 24 increases, its input power requirement increases. At the intersection of curves 50, 52, the rotating group, comprising turbine 22, centrifugal pump 24, shaft 26 and permanent magnet generator 32, will reach its maximum aerodynamic rotational speed 58. In one embodiment, the peak efficiency 54 of the turbine 22 occurs at a lower rotational speed than the intersection 58. In one embodiment, the peak efficiency 54 of the turbine 22 occurs at about 80,000 rpm, and the maximum aerodynamic rotational speed 58 of the rotating group is about 110,000 rpm.

The design of the turbine 22 such that its peak efficiency 54 at a speed lower than a speed of the peak power requirement of the centrifugal pump 24 protects the TPA 20 from becoming damaged in the event of damage to the passive electrical proportional turbine speed control system. In one embodiment, this design is accomplished by incorporating a feature into a disk of the turbine 22 that causes the turbine efficiency to decrease beyond a predetermined speed. In another embodiment, an angle of attack in the turbine 22 is designed such that the turbine efficiency decreases beyond a predetermined speed. In another embodiment, a chord length of a disk of turbine 22 is designed such that the turbine efficiency decreases beyond a predetermined speed. In yet another embodiment, a disk of the turbine 22 is designed such that the blades deform (twist) at high speeds, thereby negatively altering the blade incidence angles. In this embodiment, as the speed of the turbine 22 increases beyond a predetermined speed, the turbine disk will deform due to a higher radial load, which decreases the efficiency of the turbine 22.

In further embodiments, the centrifugal pump 24, permanent magnet generator 32 and shaft 26 are designed such that the rotating group operates at the maximum aerodynamic rotational speed 58.

Although the different examples have a specific component shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A turbine pump assembly, comprising:
   a turbine having a peak efficiency at a first speed;
   a centrifugal pump;
   a passive electrical speed control system; and
   the first speed is lower than a second speed at which the centrifugal pump is operating at a peak power requirement.

2. The turbine pump assembly of claim 1, wherein a disk of the turbine is configured to deform when a rotational speed of the turbine exceeds the first speed.

3. The turbine pump assembly of claim 1, wherein the turbine drives the centrifugal pump.

4. The turbine pump assembly of claim 1, wherein the turbine and the centrifugal pump rotate about a common shaft.

5. The turbine pump assembly of claim 4, wherein the passive electrical speed control system comprises a generator and a valve control solenoid.

6. The turbine pump assembly of claim 5, wherein the generator is arranged along the shaft between the centrifugal pump and the turbine.

7. The turbine pump assembly of claim 1, wherein the turbine is powered by a propellant provided by a main engine turbo-pump assembly of a vehicle.

8. The turbine pump assembly of claim 7, wherein the propellant is hydrogen gas.

9. The turbine pump assembly of claim 1, wherein the passive electrical speed control system further comprises a valve configured to meter a flow of propellant to the turbine.

10. The turbine pump assembly of claim 9, wherein the passive electrical speed control system further comprises a valve control solenoid configured to exert an axial force on the valve, such that the valve meters the flow of propellant proportional to a speed of the turbine.

11. A rocket thrust vector control system, comprising:
an engine nozzle;
a turbine pump assembly having a turbine with a peak efficiency at a first speed, a centrifugal pump, and a passive electrical speed control system; and
wherein the first speed is lower than a second speed at which the centrifugal pump is operating at a peak power requirement.

12. The rocket thrust vector control system as recited in claim 11, wherein a disk of the turbine is configured to deform when a rotational speed of the turbine exceeds the first speed.

13. The rocket thrust vector control system as recited in claim 11, wherein the turbine drives the centrifugal pump.

14. The rocket thrust vector control system as recited in claim 11, wherein the turbine is powered by a propellant provided by a main engine turbo-pump assembly of a vehicle.

15. The rocket thrust vector control system as recited in claim 11, wherein the passive electrical speed control system, comprises a generator and a valve control solenoid.

16. The turbine pump assembly of claim 2, wherein the disk is configured to twist when a rotational speed of the turbine exceeds the first speed.

17. The turbine pump assembly of claim 1, wherein the turbine has an operating speed between 90,000 rpm and 140,000 rpm.

18. The turbine pump assembly of claim 1, wherein the first speed is 80,000 rpm.

19. The rocket thrust vector control system as recited in claim 12, wherein the disk is configured to twist when a rotational speed of the turbine exceeds the first speed.

20. The rocket thrust vector control system as recited in claim 11, wherein the turbine has an operating speed between 90,000 rpm and 140,000 rpm.

* * * * *